Dec. 18, 1956   M. S. OLSON ET AL   2,774,279
SPECTACLES FOR ATHLETIC COMPETITORS
Filed Feb. 9, 1953
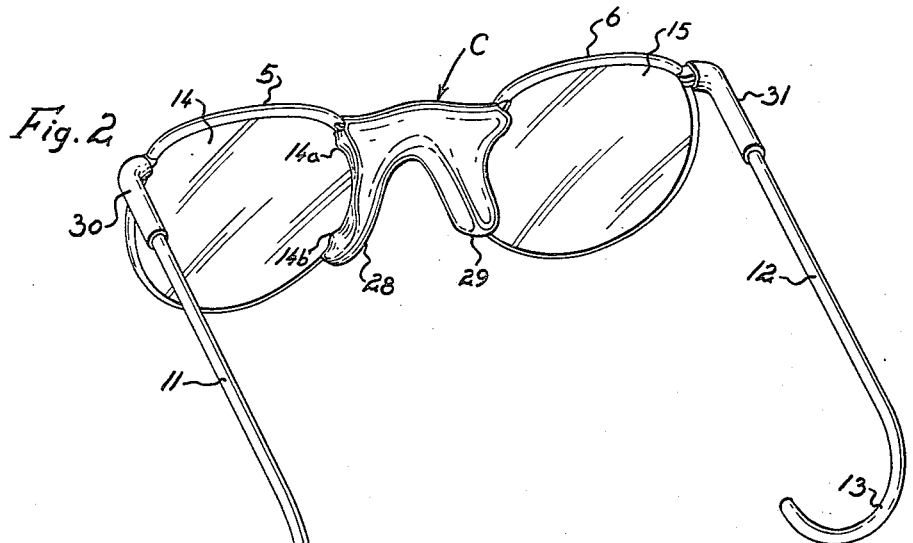
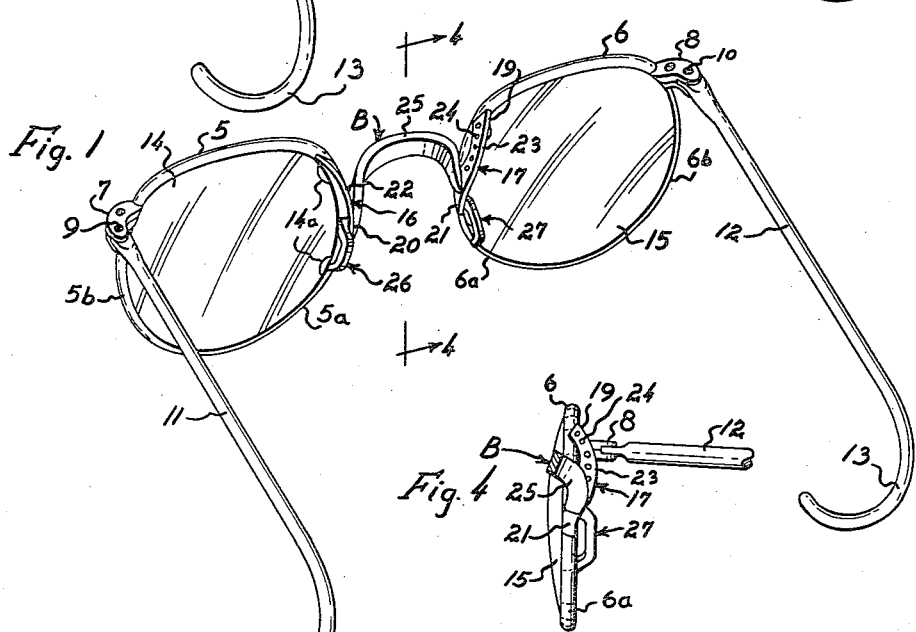
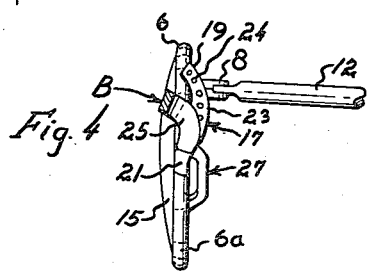
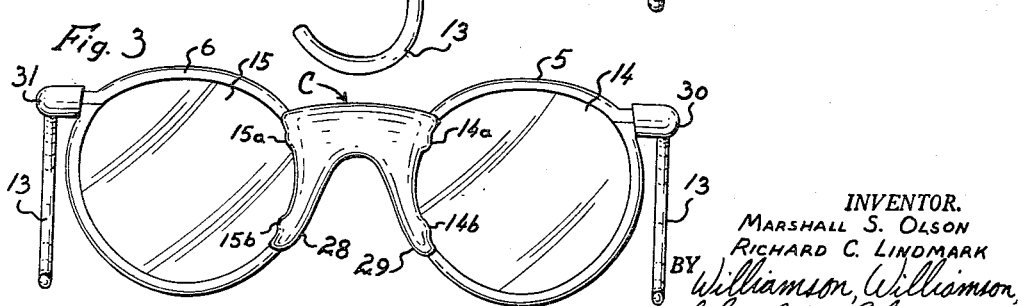
INVENTOR.
MARSHALL S. OLSON
RICHARD C. LINDMARK
BY Williamson, Williamson,
Schroeder & Adams
ATTORNEYS 2,774,279
Patented Dec. 18, 1956

2,774,279

SPECTACLES FOR ATHLETIC COMPETITORS

Marshall S. Olson and Richard C. Lindmark, Minneapolis, Minn., assignors to N. P. Benson Optical Company, Inc., Minneapolis, Minn., a corporation of Minnesota Application February 9, 1953, Serial No. 335,664

6 Claims. (Cl. 88—43)

This invention relates to ophthalmic lens mountings. More particularly it relates to ophthalmic lens mountings adapted to withstand rough usage such as is encountered during participation by the wearer in active athletic competition.

Although considerable progress has been made in producing spectacles which may be worn by persons having impaired vision while they are actively participating in athletic competition through the manufacture of non-breakable lenses and so forth, little or nothing has been accomplished to protect the facial features of the wearer from injury from the lens holding frame or to protect other competitors from injury from such frames. For example, a sharp blow on such a frame oftentimes causes the common nose pad to be broken or its supporting strap to be bent with the result that one or both gouges into the flesh of the wearer and does serious damage. Also, other competitors frequently bump into the temple hinges of such frame and are seriously injured thereby. In addition, such a blow frequently causes the lens to be sprung free of the eye wire and ejected therefrom. Another problem which exists is that lenses which approach a circular shape frequently rotate slightly within the eye wire and produce a distorted vision for the wearer. Our invention is directed toward overcoming these disadvantages.

It is a general object of our invention to provide novel and improved spectacles adapted for wear by persons actively engaged in sports and other activities where frequent and rough body contact is encountered.

A more specific object is to provide novel and improved spectacles for wear by athletic competitors which will eliminate serious damage and injury to the nose of the wearer from the spectacle frame when the wearer collides with another competitor.

Another object is to provide novel and improved spectacles constructed to absorb, in an improved manner, the shock which would ordinarily be received by the wearer when the latter collides with another competitor.

Another object is to provide novel and improved spectacles constructed to absorb, in an improved manner, the shock and stress imposed upon the frame when the latter is subjected to a sudden blow so as to reduce to a minimum the likelihood of the lens springing free of their retaining eye wires.

Another object is to provide spectacles for athletic competitors which can be worn without serious adjustment by competitors having noses of various sizes and shapes.

Another object is to provide novel and improved spectacles constructed to preclude the possibility of the lens thereof rotating within their retaining eye wires.

These and other objects and advantages of our invention will more fully appear from the following description made in connection with the accompanying drawings wherein like reference characters refer to similar parts throughout the several views and in which:

Fig. 1 is a rear perspective view of only the metal framework of the spectacles;

Fig. 2 is a rear perspective view of the completed spectacles;

Fig. 3 is a front elevational view of the same; and

Fig. 4 is a sectional view taken along line 4—4 of Fig. 1.

One embodiment of our invention, as shown in Figs. 1–4, may include a pair of eye wires 5 and 6, each having a nasal side 5a, 6a respectively and a temporal side 5b, 6b respectively. These eye wires are rigidly and fixedly connected to a central bridge member indicated generally as B. Each of the eye wires 5 and 6 carries a temple hinge 7 and 8 respectively at the upper portion of its temporal side. Each temple hinge 7 and 8 has a pivot 9 and 10 respectively which pivotally connects the respective temples 11 and 12 to the respective eye wire. Each of the temples 11 and 12 carries a bow 13 at its outer end. An elastic band (not shown) extending between the bow 13 is normally utilized to fit around the back of the head of the wearer to aid in securing the entire spectacles to the head of the wearer.

The eye wires 5 and 6 are each grooved interiorly to receive and secure therewithin a pair of lenses 14 and 15. Each of the lenses 14, 15 has a pair of recesses formed in its peripheral portions along its nasal side as best shown in Fig. 2. These recesses 14a, 14b and 15a, 15b extend inwardly from the periphery of the respective lens 14 and 15 so that there is a passage existent between the lens and the respective eye wire at such positions. Reference to Figs. 1 and 3 shows that these recesses 14a, 14b and 15a, 15b are spaced vertically and opposite each other so that the uppermost thereof is opposite the piece of the bridge section which extends between the eye wires and so that the lower recesses are opposite each other at a point substantially below that part of the bridge member.

The bridge member B includes a pair of nose strap supports 16 and 17 which are elongated straps of metal secured at their upper ends as at 18 and 19 to the respective eye wires 5 and 6 and then extend rearwardly and downwardly therefrom so that the lower ends thereof may be fixedly secured to their respective eye wires as at 20 and 21. The medial portions 22 and 23 are spaced rearwardly from the eye wires 5 and 6 so that there is an opening therebetween and are each perforated by a plurality of apertures such as 24. Fixedly secured at each of its ends to the medial portions 22 and 23 of the nose strap supports 16 and 17 is a rigid band or nose strap 25 shaped to in general follow the contour of a human nose.

Mounted upon each of the eye wires 5 and 6 adjacent the lower end portion of the nose strap supports 16 and 17 and fixedly secured to each is a strap 26 and 27. These straps extend rearwardly from each of the eye wires 5 and 6 and then downwardly and inwardly and have their lower ends fixedly secured to the eye wires at a lower level. In this manner the straps 26 and 27 each form a loop which extends rearwardly from its respective eye wire and follows in general the outline of the eye wire.

Mounted upon the bridge member B and completely encircling the same is a coating or arch indicated generally as C which is made of soft, resilient and tough material. We have found that a satisfactory material is a material having a natural rubber base and having Shore Durometer Hardness of approximately 50–60 and having non-toxic properties. We have found that such a material having a tensile strength of approximately 1200 p. s. i., an elongation of 400 percent and a set of approximately 15 percent would be quite satisfactory for this purpose. The arch C has a pair of downwardly extending legs 28 and 29 which extend downwardly along the nasal side of the respective eye wires and embrace the same. The material of this arch extends through the apertures 24 of the nose strap supports 16 and 17 and also extends through the loop members 26 and 27. The material also passes between the medial portions of the nose strap supports 16 and the eye wires 5 and 6 at that point. As can best be seen by Figs. 2 and 3, this arch C encases the nose strap completely. A portion of the material of the arch passes through each of the recesses 14a, 14b and 15a, 15b and encircles the eye wire at those points. Reference to Figs. 2 and 3 readily shows that the arch C is shaped to conform to the nose of a human being so that the spectacles may be worn in the same manner as any ordinary spectacles having nose pads which, in our invention, have been completely eliminated.

Surrounding the temple hinges 7 and 8 and extending rearwardly in encasing relation to the temples 11 and 12 is a pair of casings 30 and 31. These casings are preferably of a soft, resilient and tough material similar to that used in the arch C.

In use, the wearer applies the spectacles just as he would any other pair of spectacles with the exception that the elastic band is applied around the back of the head. The soft, resilient and tough arch cooperates with the casings 30 and 31 to absorb any severe shock which may be administered to the spectacles as a result of collision of the wearer with other competitors in sports. The shock is absorbed through the resiliency of the material of the casings 30 and 31 and the material of the arch C so that the likelihood of the lenses 14 and 15 being sprung free of the eye wires 5 and 6 as a result of the shock is reduced to a minimum. Similarly, the blow administered to the individual colliding with the wearer of the glasses is substantially reduced as a result of the resiliency of the arch C and the casings 30 and 31. The casings 30 and 31 prevent injury to the other individual colliding with the wearer of the goggles since the arch and the casings yield and the latter cover any sharp protuberances of the temple hinges 7 and 8. It is not uncommon for participants in active sports to be seriously injured as a result of coming in contact with these temple hinges on ordinary spectacles. It should be noted that the yieldability of the arch C is such that there is very little if any likelihood of the eye wires 5 and 6 being deformed by a blow suffered thereagainst to cause the lenses to be ejected by the eye wires.

A very important advantage of our spectacles is that a spectacle manufactured in accordance with our invention eliminates the need for nose pads which are commonly utilized in conjunction with spectacles and thereby eliminates the danger of injury from such nose pads and the mounting which supports the same. By eliminating the nose pads and providing the soft, resilient arch C we positively prevent the gouging and serious injury to the nose which often is suffered by a wearer when the conventional type of spectacles is worn in sport competition. At the same time, the jar or shock which is transmitted to the facial portion of the wearer is reduced to a minimum when a collision between the competitors occurs.

It should be noted that the portions of the arch C which pass through the recesses 14a, 14b and 15a, 15b and pass around the eye wires 5 and 6 serve a dual purpose. These portions securely affix the arch to the eye wires so as to preclude the same from being torn away from the embracing relation in which the material of the arch C extends. Reference to Figs. 2 and 3 shows that the material of the arch C extends around the eye wires and embraces the same along the nasal sides thereof. The material passing through the recesses locks the lenses to the eye wires 5 and 6 and prevents their rotation and hence prevents the vision of the wearer from being seriously impaired as a result of such rotation.

It should also be noted that the loops 26 and 27 provide strength to the bodies of the legs 28 and 29 of the arch and at the same time provide for permanent affixation of the material of the legs 28 and 29 to the eye wires 5 and 6 and to the bridge B. These loops 26 and 27 provide support for the legs of the arch and means for affixing these legs securely and permanently to the eye wires.

Another advantage of our spectacles is that the bridge member B can be rebent slightly beneath the rubber coating or arch C so as to permit any given pair of spectacles constructed in accordance with our invention to be adjusted to fit all types of human noses. In other words, any given pair of spectacles can be adapted to any individual competitor desiring to wear the same by simply rebending the bridge member B slightly beneath the arch C. This can be accomplished by grasping the respective eye wires and bending them toward or apart from each other as may be desired.

Thus it can be seen that we have provided novel and improved spectacles for wear by competitors in active sports wherein the likelihood of severe collisions is relatively great. It can be readily seen that anyone may wear these spectacles with comfort and increased safety and without fear of having their facial features permanently damaged or scarred as a result of injury from the portions of the spectacles which support them upon the nose of the wearer. At the same time, added protection is provided to other competitors who might accidentally collide with the wearer during competition.

It will of course be understood that various changes may be made in the form, details, arrangement and proportions of the various parts without departing from the scope of our invention.

What we claim is:

1. An ophthalmic assembly including in combination an eye wire having a nasal and a temporal side, a lens mounted within said eye wire and having a nasal side with a recess formed in the peripheral portions thereof, a bridge member rigidly connected with said eye wire and supporting the same, and a soft, resilient and tough arch encasing said bridge member and having portions thereof extending through the recess of said lens and encircling the nasal side of said eye wire to preclude rotation of said lens and more firmly affix said arch to said bridge member and said eye wire, said arch being shaped to conform to the bridge of a nose of a human and functioning to protect the wearer from said eye wire and said bridge member in the event of a sharp concussion received thereagainst and to simultaneously protect said eye wire from deformation and consequent ejection of its lens.

2. An ophthalmic assembly including in combination an eye wire having a nasal side, a lens mounted within said eye wire, a bridge member rigidly connected with said eye wire and supporting the same, a rigid loop member mounted on said eye wire and extending rearwardly from the nasal side thereof, and an arch made of soft, resilient and tough material encasing said bridge member and extending through said loop and completely encasing the same, said arch being shaped to conform to the bridge of a nose of a human and functioning to protect the wearer from said eye wire and from said bridge member in the event of a sharp concussion received thereagainst and to simultaneously protect said eye wire from deformation and consequent ejection of its lens.

3. The structure defined in claim 2, the major portion of said loop member being positioned below said bridge member and said arch having portions thereof extending downwardly to encase said loop member and embrace the nasal side of said eye wire.

4. An ophthalmic assembly including in combination an eye wire having a nasal side, a lens mounted within said eye wire, a bridge member rigidly connected with said eye wire and supporting the same, said bridge member including a nose strap support secured to said eye wire but having its medial portions spaced rearwardly therefrom, said medial portions having apertures extending therethrough, a rigid loop member mounted on said eye wire and extending rearwardly from the nasal side thereof, and a soft but tough rubber arch encasing said loop member and said bridge member and extending through said loop member and having portions thereof extending through said apertures and filling the same, said arch being shaped to conform to the bridge of a nose of a human and functioning to protect the wearer from said eye wire and said bridge member in the event of a sharp concussion received thereagainst and to simultaneously protect said eye wire from deformation and consequent ejection of its lens.

5. An ophthalmic assembly including in combination an eye wire having a nasal side, a lens mounted within said eye wire, a bridge member rigidly connected with said eye wire and supporting the same, a strap secured at one of its ends to the nasal side of said eye wire and extending rearwardly and then downwardly therealong in spaced relation thereto, and an arch made of soft, resilient and tough material encasing said bridge member and said strap completely, said arch being shaped to conform to the bridge of a nose of a human and functioning to protect the wearer from said eye wire and said bridge member in the event of a sharp concussion received thereagainst and to simultaneously protect said eye wire from deformation and consequent ejection of its lens.

6. An article of manufacture consisting of a lens frame comprised of a pair of eye wires each having a nasal and temporal side, a central bridge member rigidly connected with said eye wires and extending therebetween and supporting the same, a rigid loop member mounted on the nasal side of each of said eye wires and extending rearwardly therefrom in opposed positions and a soft, resilient and tough coating applied to said frame in encasing relation to said bridge members and said loop member and securely affixed thereto and extending through said loop members to preclude its being torn therefrom when said frame is worn by competitors in athletics.

References Cited in the file of this patent

UNITED STATES PATENTS

| | | |
|---|---|---|
| 411,164 | Molitor | Sept. 17, 1889 |
| 1,385,828 | Hogue | July 26, 1921 |
| 1,517,685 | Searles | Dec. 2, 1924 |
| 1,868,450 | Wall | July 19, 1932 |
| 2,561,403 | Nelson | July 24, 1951 |
| 2,582,345 | Moeller | Jan. 15, 1952 |

FOREIGN PATENTS

| | | |
|---|---|---|
| 22,657 | Great Britain | of 1898 |
| 21,009 | Great Britain | of 1911 |